(12) United States Patent
Matsunaga et al.

(10) Patent No.: US 7,639,445 B2
(45) Date of Patent: Dec. 29, 2009

(54) DISK DRIVE DEVICE AND HEAD POSITIONING CONTROL METHOD

(75) Inventors: Toshitaka Matsunaga, Akishima (JP); Hideo Sado, Ome (JP); Seiji Mizukoshi, Hamura (JP); Shouji Nakajima, Kodaira (JP); Katsuki Ueda, Tachikawa (JP); Shinichirou Kouhara, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/244,662

(22) Filed: Oct. 2, 2008

(65) Prior Publication Data

US 2009/0168225 A1 Jul. 2, 2009

(30) Foreign Application Priority Data

Dec. 26, 2007 (JP) ............................. 2007-335287

(51) Int. Cl.
*G11B 21/10* (2006.01)
*G11B 5/596* (2006.01)

(52) U.S. Cl. .................... 360/75; 360/77.04; 360/77.11
(58) Field of Classification Search ................... None
See application file for complete search history.

(56) References Cited

U.S. PATENT DOCUMENTS

| 4,598,327 A | 7/1986 | Jen et al. | |
| 6,965,489 B1* | 11/2005 | Lee et al. | 360/75 |
| 6,989,954 B1* | 1/2006 | Lee et al. | 360/75 |
| 7,016,134 B1* | 3/2006 | Agarwal et al. | 360/75 |
| 7,068,459 B1* | 6/2006 | Cloke et al. | 360/75 |
| 7,088,533 B1* | 8/2006 | Shepherd et al. | 360/75 |
| 7,113,362 B1* | 9/2006 | Lee et al. | 360/77.04 |
| 7,248,426 B1 | 7/2007 | Weerosooviya et al. | |
| 7,330,327 B1* | 2/2008 | Chue et al. | 360/75 |
| 7,333,280 B1* | 2/2008 | Lifchits et al. | 360/75 |
| 7,499,236 B1* | 3/2009 | Lee et al. | 360/75 |
| 2008/0151414 A1* | 6/2008 | Matsunaga et al. | 360/77.08 |

FOREIGN PATENT DOCUMENTS

JP  2003-217241  7/2003

* cited by examiner

*Primary Examiner*—Hoa T Nguyen
*Assistant Examiner*—James L Habermehl
(74) *Attorney, Agent, or Firm*—Knobbe, Martens, Olson & Bear LLP

(57) ABSTRACT

According to one embodiment, a disk drive includes a detection signal producing module configured to produce a detection signal by reading each of the spiral servo patterns, the spiral servo patterns being read by a head while the head scans a circumferential direction region on the disk media. A position error computation module is configured to produce servo burst signals A, B, C, and D using a plurality of frames obtained by dividing the detection signal at even time intervals, at least one burst signal of the servo burst signals being produced using at least two frames in the frames, and to compute a position error of the head based on amplitude values of the produced burst signals.

9 Claims, 13 Drawing Sheets

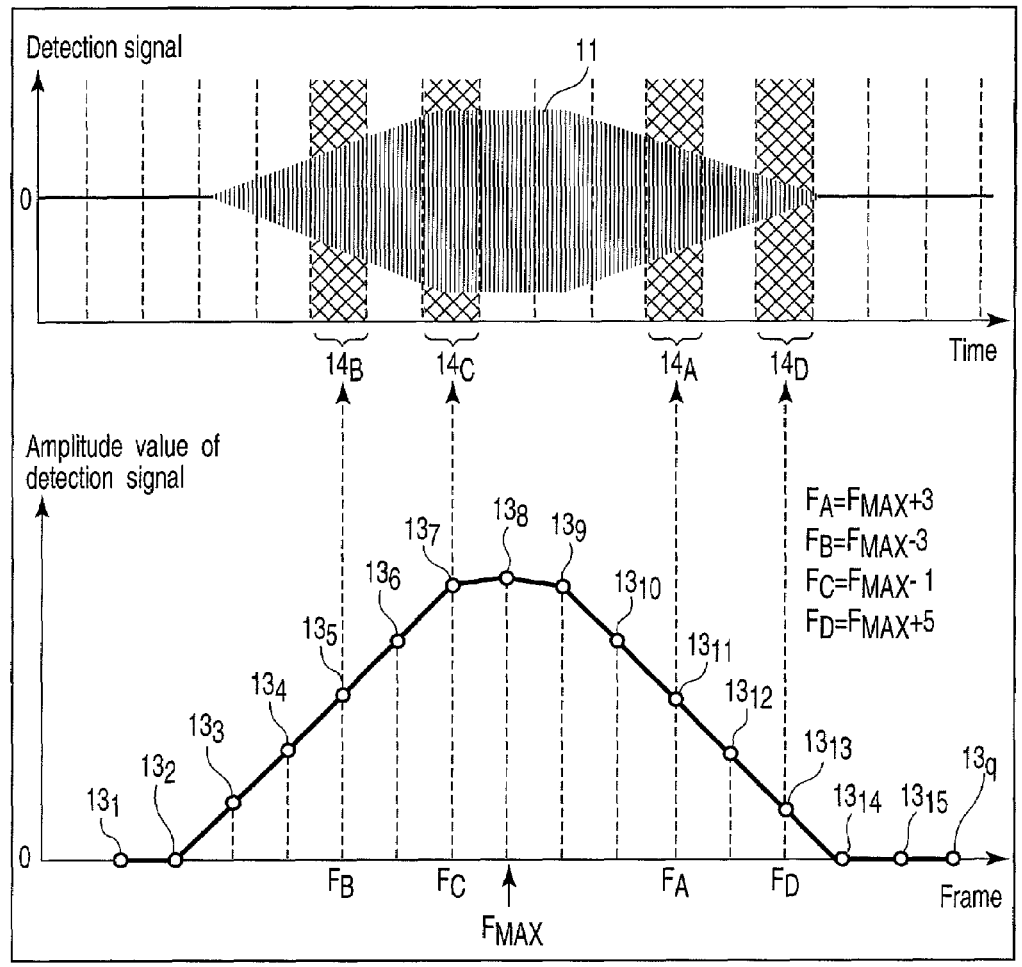
F I G. 13

DISK DRIVE DEVICE AND HEAD POSITIONING CONTROL METHOD

CROSS-REFERENCE TO RELATED APPLICATIONS

This application is based upon and claims the benefit of priority from Japanese Patent Application No. 2007-335287, filed Dec. 26, 2007, the entire contents of which are incorporated herein by reference.

BACKGROUND

1. Field

One embodiment of the present invention relates to a disk drive device provided with a disk media and a head positioning control method applied to the disk drive device.

2. Description of the Related Art

Generally, in a disk drive device typified by a hard disk drive (sometimes simply referred to as disk drive), a servo pattern (servo data) is written on a disk media which is of a recording media. The servo pattern is used to perform head positioning control. In the disk drive, a head is positioned at a target position (target track) on the disk media using the servo pattern read by the head.

Usually, the servo pattern written on the disk media includes plural radial servo patterns (sometimes also referred to as servo wedge). The plural radial servo patterns are used to define plural concentric tracks on the disk media. The radial servo pattern is written on the disk media through a servo writing process included in a disk drive production process.

Recently, there is proposed a method, in the servo writing process, plural spiral servo patterns (sometimes referred to as spiral tracks) which become a base pattern (seed pattern) are written on the disk media and the radial servo patterns are written based on the plural spiral servo patterns (for example, see U.S. Pat. No. 7,248,426 B1).

In such cases, the radial servo pattern is a servo pattern (product servo pattern) which is used during an actual operation in the disk drive shipped as a product. Accordingly, finally each spiral servo pattern is deleted from the disk media by overwrite.

In the servo writing process, the disk media in which the plural spiral servo patterns are recorded is usually incorporated in the disk drive. The plural radial servo patterns (product servo pattern) are written on the disk media by a self-servo writing process performed by the disk drive.

In writing the radial servo pattern, a read head reads the plural spiral servo patterns to obtain a detection signal. The disk drive computes a position error to perform head positioning control based on the detection signal. The disk drive usually includes a head called an integrated head. A read head which reads the servo pattern and data and a write head which writes the servo pattern and data are mounted on the integrated head while the read head separated from each other. A width of the read head is relatively narrower than a width of the write head. This leads to generation of a signal having a particular shape, specifically a hexagonal shape in the detection signal of the spiral servo pattern read by the read head.

In the position error computation method adopted to perform the head positioning control, there is well known a position error computation algorithm for the radial servo pattern. Servo burst signals A, B, C, and D are used in the position error computation algorithm. The position error computation method is an algorithm which enables the head position error to be computed with sufficient accuracy. However, the detection signal obtained by reading the plural spiral servo patterns is different from the servo burst signals A, B, C, and D. Accordingly, it is difficult that the detection signal is directly used in the position error computation algorithm.

Therefore, it is necessary to realize a new function of being able to position the head with sufficient accuracy using the detection signal obtained by reading the plural spiral servo patterns.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 13 is an exemplary view for explaining an example of a relationship between selected frames and servo burst signals A, B, C, and D;

DETAILED DESCRIPTION

Various embodiments according to the invention will be described hereinafter with reference to the accompanying drawings. In general, according to one embodiment of the invention, a disk drive device includes a disk media in which a plurality of spiral servo patterns are written. The disk drive device also includes a detection signal producing module and a position error computation module. The detection signal producing module is configured to produce a detection signal by reading each of the spiral servo patterns, the spiral servo patterns being read by a head while the head scans a circumferential direction region on the disk media. The position error computation module is configured to produce servo burst signals A, B, C, and D using a plurality of frames obtained by dividing the detection signal at even time intervals. In this case, at least one burst signal of the servo burst signals A, B, C, and D is produced using at least two frames in the frames. The position error computation module compute a position error of the head based on amplitude values of the produced burst signals A, B, C, and D.

Figure 1:
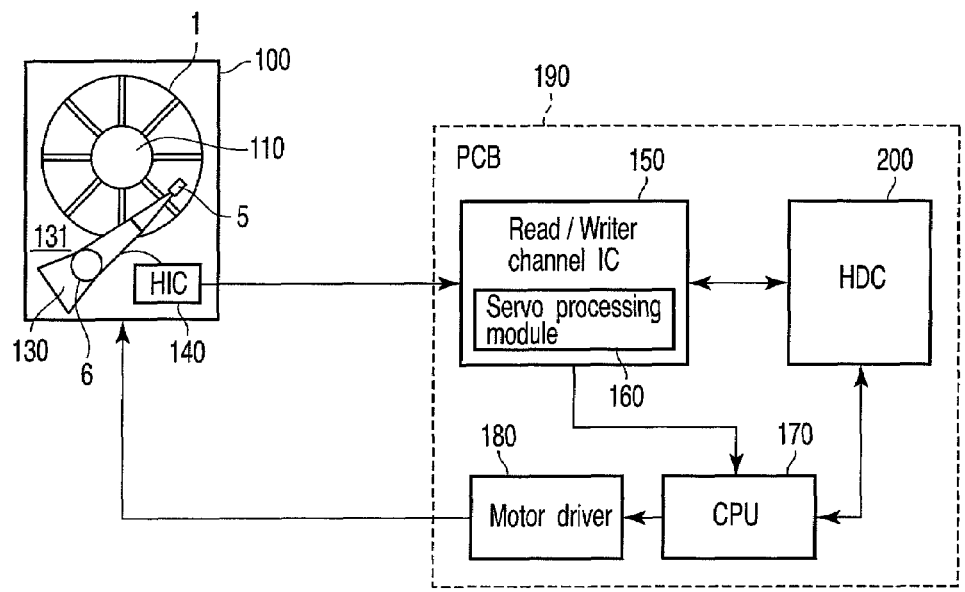
FIG. 1 is an exemplary block diagram showing a configuration of a disk drive device according to an embodiment of the invention.

FIG. 1 is a block diagram schematically showing a disk drive device according to an embodiment of the invention.

A disk drive device 100 of the embodiment includes a disk media 1 which is of a magnetic disk, a head 5, a spindle motor 110, an actuator arm 130, a head amplifier (HIC: head IC) 140, and a printed circuit board (PCB) 190.

Figure 3:
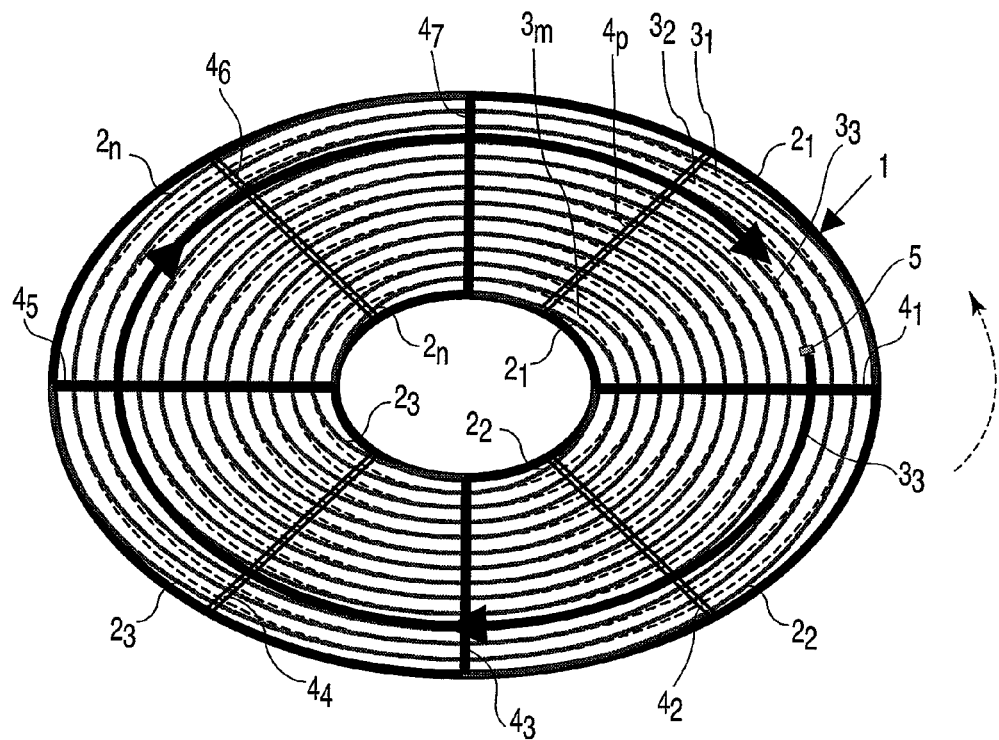
FIG. 3 shows a disk media in which a multi spiral servo pattern is written, used in the disk drive device of the embodiment.

The disk media 1 is rotated at high speed by a spindle motor 110. In the embodiment, as shown in FIG. 3, a multi spiral servo pattern including plural spiral servo patterns is recorded as a base pattern for the head positioning on the disk media 1. The multi spiral servo pattern is recorded on the disk media 1 by a servo track writer (STW).

The head 5 reads and writes data from and in the disk media 1. The head is of an integrated head including a read head and a write head. The read head reads the multi spiral servo pattern, a radial servo pattern, and user data from the disk media 1. The write head writes the user data in a data area except for a servo sector on the disk media 1. The write head also writes the radial servo pattern during a self-servo writing operation described below.

The actuator arm 130 acts as part of a head moving mechanism 131. The head moving mechanism 131 moves the head 5 in a radial direction of the disk media 1. The head 5 is mounted on a fore-end of the actuator arm 130. The actuator arm 130 is supported by a pivot 6 so as to be rotated about the pivot 6. The actuator arm 130 is driven by a voice coil motor (not shown). The voice coil motor drives the actuator arm 130 to position the head 5 at any radial position on the disk media 1. The head moving mechanism 131 includes the voice coil motor and the actuator arm 130.

The voice coil motor is driven and controlled by a motor driver 180. The head amplifier 140 amplifies a read signal from the read head in the head 5 to supply the read signal to a read/writer channel IC 150. The motor driver 180 and the read/writer channel IC 150 are mounted on PCB 190.

The read/writer channel IC 150, a microprocessor (CPU) 170, the motor driver 180, and a hard disk controller (HDC) 200 are mounted on PCB 190. The read/writer channel IC 150 is of a signal processing unit which processes read and write signals. The read/writer channel IC 150 includes a servo processing module 160 which performs a process of reproducing a servo signal of the multi spiral servo pattern and a servo signal of the radial servo pattern.

The servo processing module 160 includes an address code detection unit, a servo burst signal demodulation unit, and a servo data reproduction unit. The address code detection unit detects a sector address code and a track (cylinder) address code from the read signal. The sector address code and the track (cylinder) address code are included in the radial servo pattern. The servo burst signal demodulation unit performs a process of demodulating the detection signal of the multi spiral servo pattern and a process of demodulating a servo burst signal included in the radial servo pattern. The servo data reproduction unit supplies the address code detected by the address code detection unit and amplitude values of demodulated servo burst signals A, B, C, and D to CPU 170.

The motor driver 180 includes a VCM driver and an SPM driver. Under the control of CPU 170, the VCM driver supplies a drive current to the voice coil motor (VCM) which drives the actuator 130. The SPM driver supplies a drive current to the spindle motor (SPM) 110 in order to rotate the disk media 1.

HDC 200 is an interface which performs data transmission between the disk drive 100 and an external host system. Based on the control of CPU 170, HDC 200 performs a process of transmitting the user data supplied from the read/writer channel IC 150 to the host system and a process of receiving the data from the host system to transmit the received data to the read/writer channel IC 150.

The data from the host system includes data (servo data) for the radial servo pattern. The data (servo data) for the radial servo pattern is data which should be written on the disk media 1 by the self-servo writing operation.

CPU 170 is a main controller which controls an operation of the disk drive 100. CPU 170 has a function of performing the self-servo writing operation of the embodiment. In the disk drive 100 which is shipped as a product, CPU 170 performs head positioning control of the head 5 based on the radial servo pattern (product servo pattern) written on the disk media 1.

Configuration of Servo Track Writer

Figure 2:
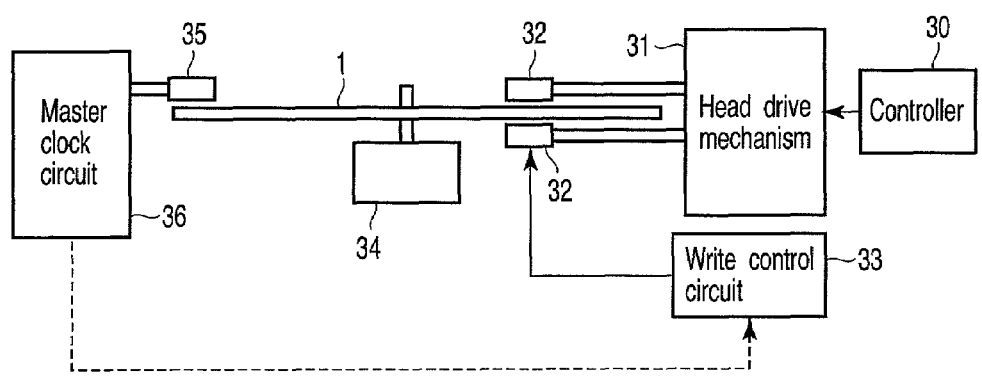
FIG. 2 is an exemplary block diagram showing a configuration of a servo track writer.

FIG. 2 is a block diagram showing a main part of a servo track writer (STW) of the embodiment. The servo track writer (STW) is installed in a clean room. The servo track writer (STW) is a servo writing dedicated apparatus which writes the multi spiral servo pattern, used as the base pattern, on the disk media 1 before the self-servo writing process.

As shown in FIG. 2, the servo track writer includes a controller 30, a head drive mechanism 31, a servo head 32, a write control circuit 33, a spindle motor 34, a clock head 35, and a master clock circuit 36.

The spindle motor 34 rotates the disk media 1. No piece of data is written in the disk media 1. The servo head 32 is mounted on a slider while the read head and the write head are separated. The read head reads the multi spiral servo pattern. The write head writes the multi spiral servo pattern.

The controller 30 mainly includes a microprocessor and a memory. The controller 30 controls operations of the head drive mechanism 31, write control circuit 33, spindle motor 34, and master clock circuit 36. The controller 30 controls the head drive mechanism 31 to perform the head positioning control of the servo head 32.

The head drive mechanism 31 is an actuator which moves the servo head 32 to a designated position on the disk media 1. The head drive mechanism 31 is driven by the voice coil motor. The write control circuit 33 delivers servo data for writing the spiral servo pattern to the servo head 32. The servo head 32 writes the multi spiral servo pattern on the disk media 1 based on the servo data from the write control circuit 33. FIG. 3 shows the multi spiral servo pattern written on the disk media 1.

The master clock circuit 36 delivers a clock signal to the clock head 35 under the control of the controller 30. The clock head 35 writes the clock signal in an outer-most circumferential region on the disk media 1. The controller 30 refers to the clock signal as a reference position information signal, when the servo head 32 is positioned while moved from an inner-most circumferential side toward an outer-most circumferential side on the disk media 1.

Multi Spiral Servo Pattern

The multi spiral servo pattern of the embodiment and the detection signal of the multi spiral servo pattern will be described below with reference to FIGS. 3, 4, 6, and 7.

FIG. 3 conceptually shows the multi spiral servo pattern written in the whole surface of the disk media 1. The multi spiral servo pattern is written by the servo track writer of FIG. 2.

The multi spiral servo pattern is a servo burst pattern which is used to perform the tracking to position the head 5 at the target position on the disk media 1. The multi spiral servo pattern includes n spiral servo patterns $2_1$ to $2_n$. Each of the spiral servo patterns $2_1$ to $2_n$ is realized by, for example, a burst signal.

Each of the spiral servo patterns $2_1$ to $2_n$ has a length of about 10 to about 20 rotations. The number n of spiral servo patterns constituting the multi spiral servo pattern ranges from about 300 to about 400.

The disk media 1 in which the spiral servo patterns $2_1$ to $2_n$ are written is incorporated in the disk drive 100. Then, in the disk drive 100, using the head 5, P radial servo patterns $4_1$ to $4_p$ are written on the disk media 1 by the self-servo writing function.

In the self-servo writing, CPU 170 writes the radial servo patterns $4_1$ to $4_p$ for defining each concentric track on the disk media 1 while performing the tracking of the head 5 onto each of center lines $3_1$ to $3_m$ of the concentric tracks shown by broken lines. The multi spiral servo patterns $2_1$ to $2_n$ are used in the tracking.

In FIG. 3, an arrow shown by a solid line indicates the state in which the head 5 (specifically, read head) scans a concentric track $3_3$. The disk media 1 is rotated in a direction shown by an arrow of a broken line.

For example, the head 5 passes through the spiral servo patterns $2_1$ to $2_n$ in a period during which the head 5 (specifically, read head) scans a circumferential region on the disk media 1 corresponding to a certain concentric track (e.g., center line $3_3$ of concentric track). When the head 5 passes through each of the spiral servo patterns $2_1$ to $2_n$, read signal is outputted from the head 5. The read signal is a detection signal obtained by reading each of the spiral servo patterns $2_1$ to $2_n$. The detection signal is used to produce a position error signal (PES). The position error signal (PES) is used to perform the tracking for maintaining the head 5 (specifically, read head) on the center line $3_3$ of the concentric track.

Figure 4:
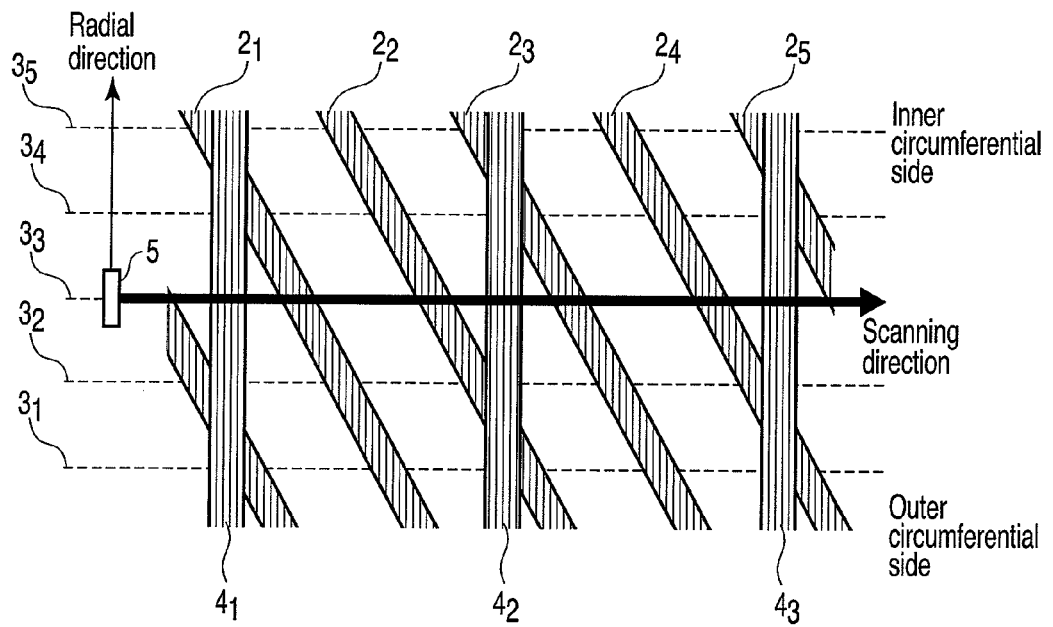
FIG. 4 shows a positional relationship between the multi spiral servo pattern and a radial servo pattern on the disk media of FIG. 3.

FIG. 4 shows a positional relationship between the multi spiral servo patterns $2_1$ to $2_5$ and the radial servo patterns $4_1$ to $4_3$. In FIG. 4, a vertical axis indicates a radial direction and a horizontal axis indicates time. As shown in FIG. 4, the radial servo patterns $4_1$ to $4_3$ are perpendicularly extended with respect to the scanning direction (circumferential direction of a disk media 1) of the head 5 (read head). On the other hand, the spiral servo patterns $2_1$ to $2_5$ are obliquely extended with respect to the scanning direction (circumferential direction of a disk media 1). Therefore, the timing the head 5 (read head) reads each spiral servo pattern is changed by the radial position of the head 5 (read head).

In the disk drive 100, after the radial servo patterns $4_1$ to $4_3$ are written on the disk media 1, the read head is controlled so as to be positioned at the center lines $3_1$ to $3_5$ of the concentric tracks based on the radial servo patterns $4_1$ to $4_3$.

Figure 5:
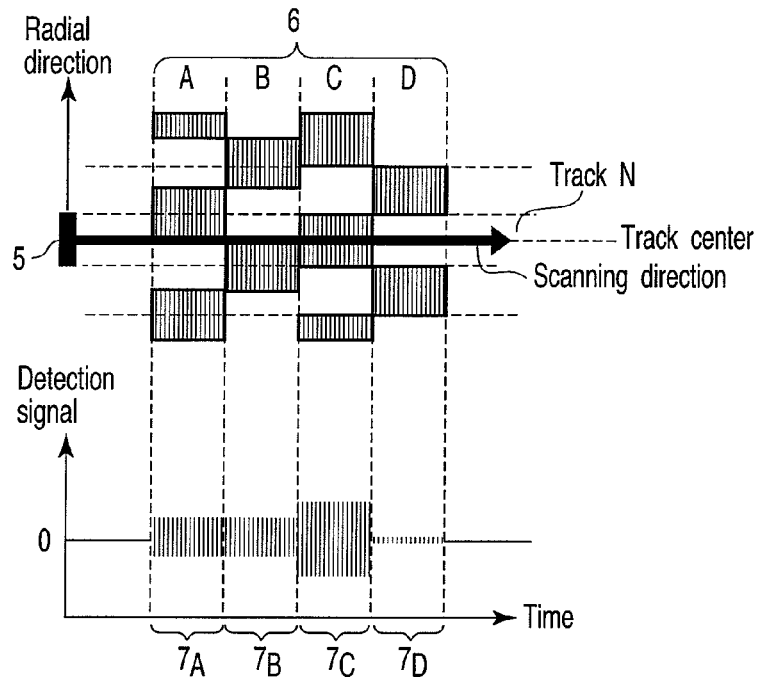
FIG. 5 is an exemplary view for explaining a servo burst signal included in the radial servo pattern.

FIG. 5 shows a servo burst signal (servo burst signals A, B, C, and D) region 6 included in each of the radial servo patterns $4_1$ to $4_p$ and the detection signal obtained by reading the servo burst signals A, B, C, and D thereof.

When the read head passes through the servo burst signal region 6, the detection signals $7_A$ to $7_D$ corresponding to the servo burst signals A, B, C, and D are obtained from the read signal supplied from the read head. In the position error computation algorithm for the radial servo pattern, the position error of the head 5 (read head) is computed using the amplitude value of the read servo burst signals A, B, C, and D, that is, the amplitude values of each of the detection signals $7_A$ to $7_D$. The amplitude value of each of the detection signals $7_A$ to $7_D$ is obtained by the servo processing module 160 of the read/writer channel IC 150.

CPU 170 determines the radial position of the read head based on the change in an amplitude value of each of the read servo burst signals A, B, C, and D, that is, the change in an amplitude value of each of the detection signals $7_A$ to $7_D$. When the read head is located on one of the center lines $3_1$ to $3_m$ of the concentric tracks, the amplitude value of the read servo burst signal A (amplitude value of a detection signal $7_A$) becomes equal to the amplitude value of the read servo burst signal B (amplitude value of a detection signal $7_B$). Hereinafter an amount of shift of the head 5 from the center line of the concentric track is referred to as a position error.

Using the amplitude values of the read servo burst signals A, B, C, and D, that is, the amplitude value of each of the detection signals $7_A$ to $7_D$, CPU 170 performs position error computation for computing the position error of the head 5 (specifically, read head). CPU 170 performs a head positioning control process (tracking process) for positioning the head 5 (specifically, read head) on the target position (center line on a certain track) on the disk media 1 based on the computation result. The head 5 (specifically, read head) is maintained at the target position (center line on a certain track) on the disk media 1 through the head positioning control process.

For example, CPU 170 computes the position error of the head 5 according to a position error computation algorithm shown by the following equations (1) to (3):

$$\text{pos1} = (A-B)/(A+B) \tag{1}$$

$$\text{pos2} = (C-D)/(C+D) \tag{2}$$

$$\text{POS} = (\text{pos1} + \text{pos2})/2 \tag{3}$$

where POS is a position error, and letters A to D are amplitude values of the servo burst signals A to D, respectively.

Figure 6:
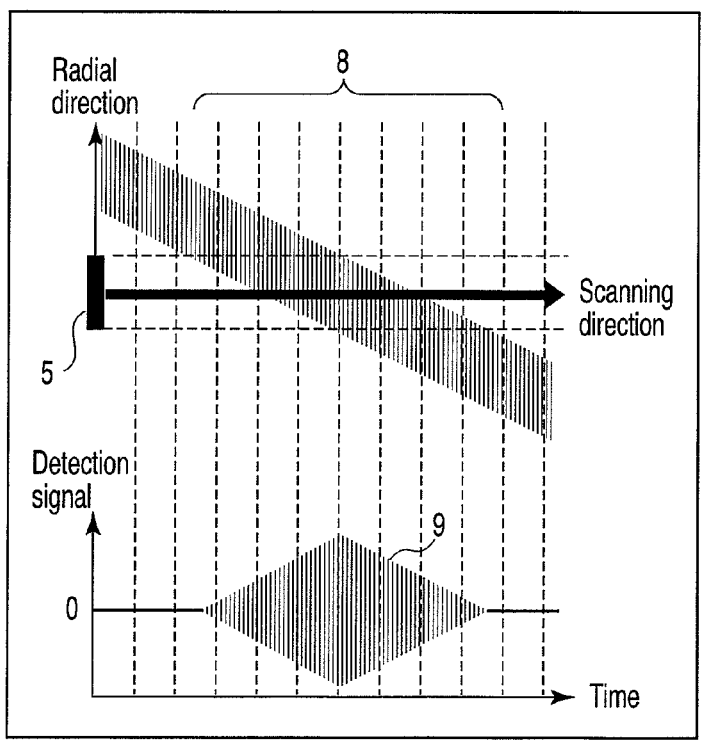
FIG. 6 is an exemplary view for explaining an example of a detection signal of the spiral servo pattern.

FIG. 6 shows a detection signal 9 which is obtained when the head 5 (read head) passes through a region 8 of the spiral servo pattern. In the case where the write head which writes the spiral servo pattern has the same width as the head 5 (read head) incorporated in the disk drive 100, the rhombic detection signal 9 is obtained as shown in FIG. 6. This is because the spiral servo pattern is obliquely extended with respect to the scanning direction of the head 5, that is, the circumferential direction of the disk media 1.

Figure 7:
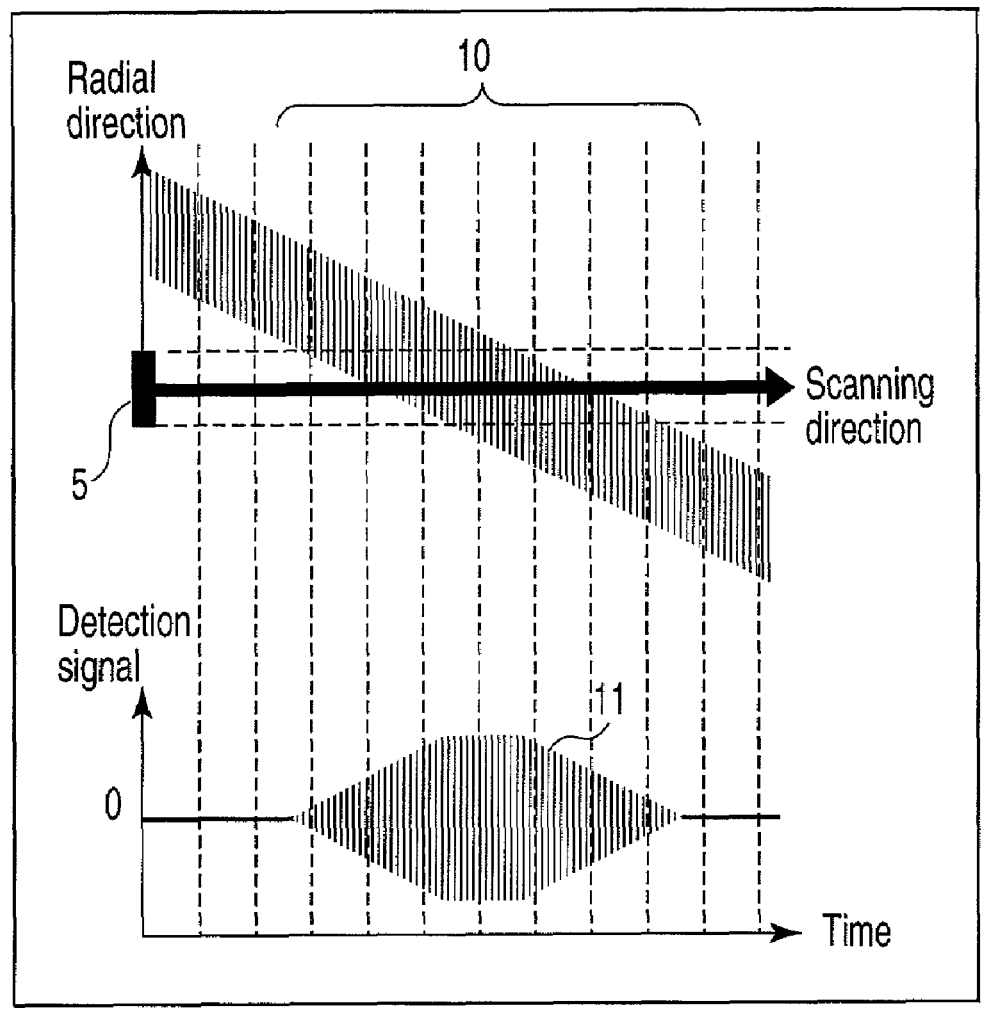
FIG. 7 is an exemplary view for explaining a hexagonal detection signal of the spiral servo pattern used in the disk drive device of the embodiment.

FIG. 7 shows a detection signal 11 which is obtained when the head 5 (read head) passes through a region 10 of the spiral servo pattern. Usually the head 5 (read head) incorporated in the disk drive 100 has the width narrower than that of the write head which writes the spiral servo pattern. Accordingly, the detection signal 11 which is obtained when the head 5 (read head) passes a certain region 10 in the spiral servo pattern actually becomes a particular shape different from the rhomboid, that is, a hexagonal signal (hexagonal burst signal).

Head Positioning Control

How the head positioning control of the head 5 is performed based on the hexagonal detection signal (burst signal waveform) 11 will be described below with reference to FIGS. 8 to 15.

In the disk drive 100, as described above, the particular shape, that is, the hexagonal detection signal (burst signal) 11 is produced from the spiral servo pattern which is read by the head 5 while the head 5 scans the circumferential direction region on the disk media 1.

In the embodiment, the hexagonal detection signal (burst signal) 11 is divided at even time intervals. The amplitude value of each of plural frames obtained by the division is used in the head positioning control of the head 5.

Figure 8:
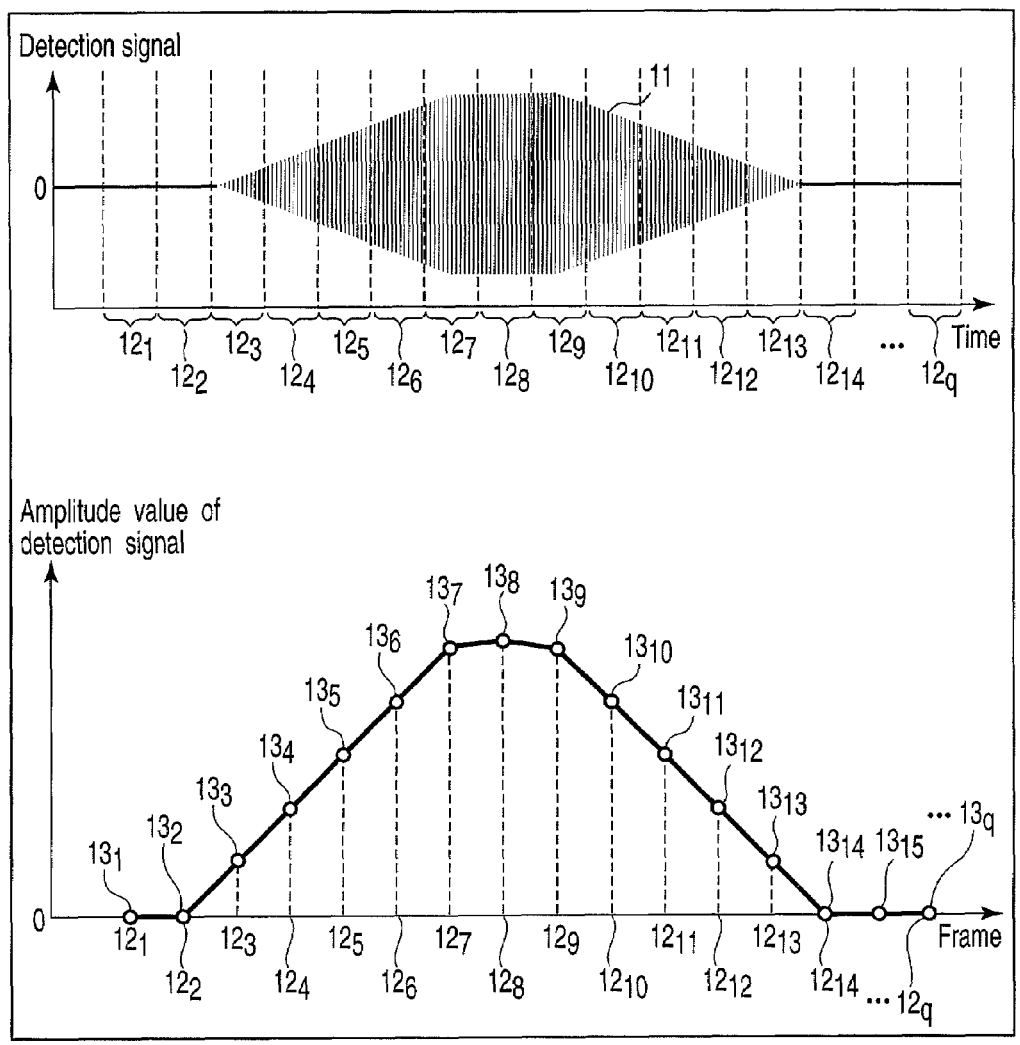
FIG. 8 is an exemplary view for explaining plural frames obtained by dividing the detection signal of FIG. 7 at even intervals.

FIG. 8 shows the hexagonal detection signal (burst signal) 11 divided at even intervals into plural frames and an amplitude value of each frame.

In FIG. 8, numeral 12 denotes each of frames (signals) obtained by dividing the hexagonal detection signal 11 at even intervals. The suffix added to the numeral 12 means a number (frame 1 to frame q) of the frame. The numeral 13 designates an amplitude value (average amplitude value) of each frame. The suffix added to the numeral 13 means a number (frame 1 to frame q) of the frame.

The numeral $13_2$ designates the amplitude value of the frame $12_2$, and similarly the numerals $13_3$, $13_4$, $13_5$, $13_6$, $13_7$, $13_8$, $13_9$, $13_{10}$, $13_{11}$, $13_{12}$, $13_{13}$, and $13_{14}$ designate the amplitude values of the frames $12_3$, $12_4$, $12_5$, $12_6$, $12_7$, $12_8$, $12_9$, $12_{10}$, $12_{11}$, $12_{12}$, $12_{13}$, and $12_{14}$, respectively. Hereinafter the amplitude value designated by the numeral $13_n$ is referred to as an amplitude value of frame signal $13_n$.

Figure 9:
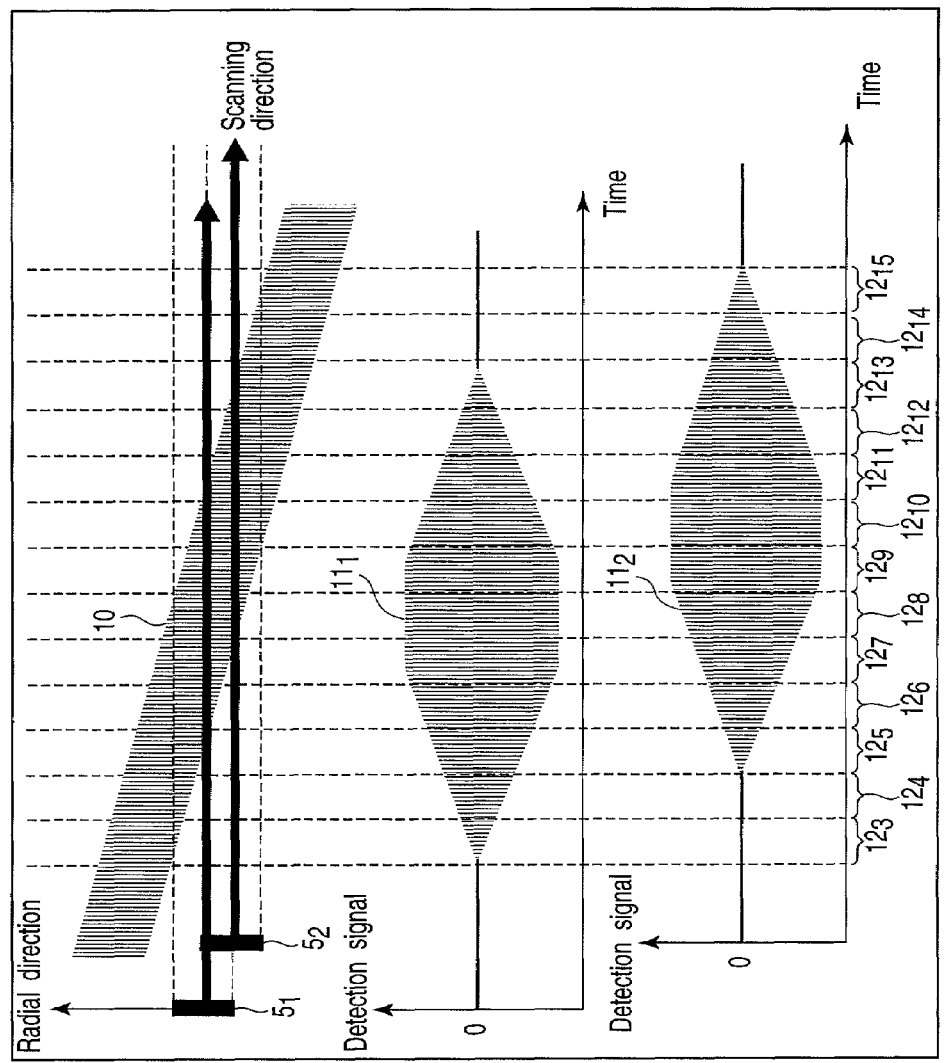
FIG. 9 is an exemplary view showing how the detection signal of FIG. 7 is changed with a change in radial position of a head.

FIG. 9 is a view showing how the detection signal obtained from the read spiral servo pattern is changed with a change in a radial position of the head 5 (read head).

That is, in the case where the head 5 (read head) is located at the radial position indicated by the numeral $5_1$ of FIG. 9, the detection signal $11_1$ shown in a central portion of FIG. 9 is obtained by reading the spiral servo pattern region 10. On the other hand, in the case where the head 5 (read head) is located at the radial position indicated by the numeral $5_2$ of FIG. 9, the detection signal $11_2$ shown in a lower portion of FIG. 9 is obtained by reading the spiral servo pattern region 10.

Although the detection signal $11_1$ and the detection signal $11_2$ have the same hexagonal shape, the detection signal $11_2$ is shifted from the detection signal $11_1$ in a time axis direction.

Figure 10:
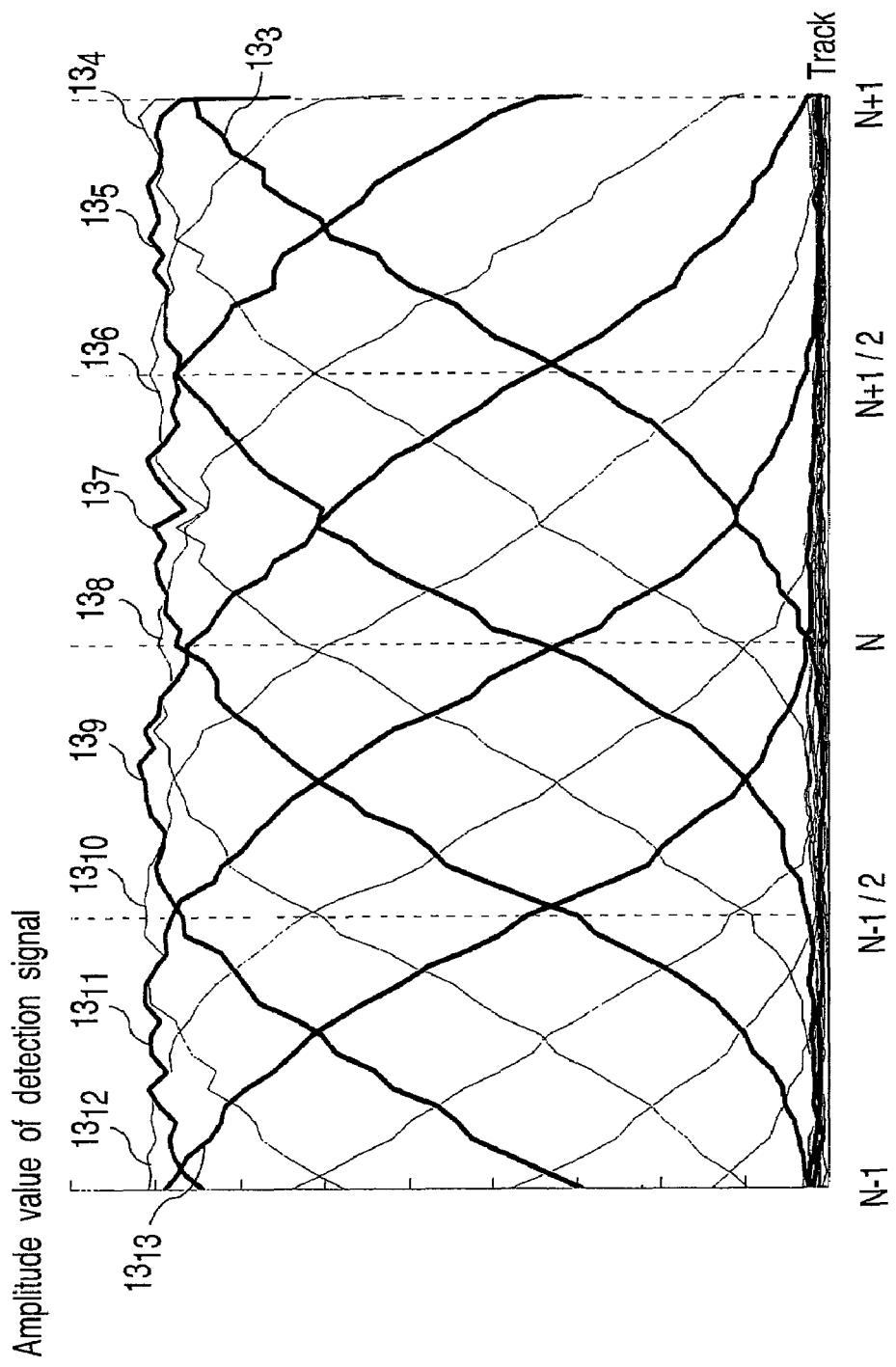
FIG. 10 is an exemplary view showing a state of a change in an amplitude value of each frame for the change in radial position of the head.

FIG. 10 shows a state of a change in an amplitude value of each frame for the change in a radial position of the head 5 (read head). The letter N designates a track center position of a concentric track n which is defined by the radial servo pattern. The letter N+1 designates a track center position of a concentric track n+1 adjacent to the inner circumferential side of the concentric track n. The letter N−1 designates a track center position of a concentric track n−1 adjacent to the outer circumferential side of the concentric track n. The letter N+½ designates a boundary position between the concentric track n and the concentric track n+1. The letter N−½ designates a boundary position between the concentric track n and the concentric track n−1.

In the embodiment, the servo burst signals A, B, C, and D are produced using the plural frames which are obtained by dividing the detection signal 11 of the spiral servo pattern. Specifically, at least one of the servo burst signals A, B, C, and D is produced using a combination of at least two predetermined frames in the plural frames. The other servo burst signals in the servo burst signals A, B, C, and D are produced respectively, for example, using the one predetermined frame of the plural frames. CPU 170 computes the position error of the head 5 using the amplitude value of at least one produced burst signal and the amplitude value of each of other produced burst signals. The position error of the head 5 is computed according to the position error computation algorithm for the radial servo pattern. That is, the position error is computed based on the produced burst signals A, B, C, and D. Since at least one of the servo burst signals A, B, C, and D is produced using the combination of at least two predetermined frames in the plural frames, the position error can be computed with high accuracy compared with the case where each of the servo burst signals A, B, C, and D is produced using a predetermined frame.

More specifically, for example, CPU 170 selects a first frame, a second frame, a third frame, and a fourth frame corresponding to the servo burst signals A, B, C, and D from the plural frames. The first frame is one which has amplitude characteristics similar to those of the servo burst signal A. The second frame is one which has amplitude characteristics similar to those of the servo burst signal B. The third frame is one which has amplitude characteristics similar to those of the servo burst signal C. The fourth frame is one which has amplitude characteristics similar to those of the servo burst signal D.

CPU 170 also selects a fifth frame and a sixth frame corresponding to the servo burst signals C and D. (1) CPU 170 uses the selected first and second frames as the servo burst signals A and B, (2) CPU 170 uses a signal obtained by a combination of the selected third frame and the selected fifth frame as the servo burst signal C, and (3) CPU 170 uses a signal obtained by a combination of the selected fourth frame and the selected sixth frame as the servo burst signal D, whereby CPU 170 computes the position error of the head 5 according to the position error computation algorithm for the radial servo pattern.

Referring to FIG. 10, attention focuses on the neighborhood of the track center position N of the concentric track n. In the track center position N, a curved line indicating a change in an amplitude value of the frame signal $13_5$ intersects a curved line indicating a change in an amplitude value of the frame signal $13_{11}$. In the neighborhoods of the track boundary position N−½ and the track boundary position N+½, it is to be understood that the amplitude value of the frame signal $13_5$ and the amplitude value of the frame signal $13_{11}$ have a complementary relation with each other (one of the amplitude values becomes the maximum while the other amplitude value becomes the minimum). That is, the increase and decrease characteristics of the amplitude value of the frame signal $13_5$ corresponding to the frame $12_5$ are similar to the increase and decrease characteristics of the amplitude value of the servo burst signal A. The increase and decrease characteristics of the amplitude value of the frame signal $13_{11}$ corresponding to the frame $12_{11}$ are similar to the increase and decrease characteristics of the amplitude value of the servo burst signal B.

Therefore, the similarity of the increase and decrease characteristics of the amplitude value and the similarity of the intersecting point are considered in the embodiment. Accordingly, the frame signal $13_5$ is selected as the first frame corresponding to the servo burst signal A, and the frame signal $13_{11}$ is selected as the second frame corresponding to the servo burst signal B. That is, the servo burst signal A is produced from the frame signal $13_5$, and the servo burst signal B is produced from the frame signal $13_{11}$.

When attention focuses on the track boundary position adjacent to N−½ of FIG. 10, it is to be understood that a curved line indicating a change in an amplitude value of the frame signal $13_7$ intersects a curved line indicating a change in an amplitude value of the frame signal $13_{13}$. That is, the increase and decrease characteristics of the amplitude value of the frame signal $13_7$ corresponding to the frame $12_7$ are similar to the increase and decrease characteristics of the amplitude value of the servo burst signal C. The increase and decrease characteristics of the amplitude value of the frame signal $13_{13}$ corresponding to the frame $12_{13}$ are similar to the increase and decrease characteristics of the amplitude value of the servo burst signal D.

Therefore, the similarity of the increase and decrease characteristics of the amplitude value and the similarity of the intersecting point are considered in the embodiment. Accordingly, the frame signal $13_7$ is selected as the third frame corresponding to the servo burst signal C, and the frame signal $13_{13}$ is selected as the fourth frame corresponding to the servo burst signal D.

Additionally, in the embodiment, the frame signal $13_9$ is selected as the fifth frame corresponding to the servo burst signal C, and the frame signal $13_3$ is selected as the sixth frame corresponding to the servo burst signal D.

The servo burst signal C can be produced by a combination of the frame signal $13_7$ selected as the third frame and the frame signal $13_9$ selected as the fifth frame. Specifically, CPU 170 compares the amplitude value of the frame signal $13_7$ and the amplitude value of the frame signal $13_9$ to obtain the smaller amplitude value, and CPU 170 uses the smaller amplitude value in the frame signal $13_7$ and the frame signal $13_9$ as the amplitude value of the servo burst signal C. In other words, CPU 170 produces the new frame signal by the combination of the frame signal $13_7$ and the frame signal $13_9$. The frame signal has the same change in amplitude value as that of the frame signal $13_7$ when the radial position of the head 5 (read head) ranges from N to N−1. Additionally the frame signal has the same change in amplitude value as that of the frame signal $13_9$ when the radial position of the head 5 (read head) ranges from N to N+1.

The servo burst signal D can be produced by a combination of the frame signal $13_{13}$ selected as the fourth frame and the frame signal $13_3$ selected as the sixth frame. Specifically, CPU 170 compares the amplitude value of the frame signal $13_3$ and the amplitude value of the frame signal $13_{13}$ to obtain the larger amplitude value, and CPU 170 uses the larger amplitude value in the frame signal $13_3$ and the frame signal $13_{13}$ as the amplitude value of the servo burst signal D. In other words, CPU 170 produces the new frame signal by the combination of the frame signal $13_3$ and the frame signal $13_{13}$. The frame signal has the same change in amplitude value as that of the frame signal $13_{13}$ when the radial position of the head 5 (read head) ranges from N to N—1. Additionally the frame signal has the same change in amplitude value as that of the frame signal $13_3$ when the radial position of the head 5 (read head) ranges from N to N+1.

Figure 11:
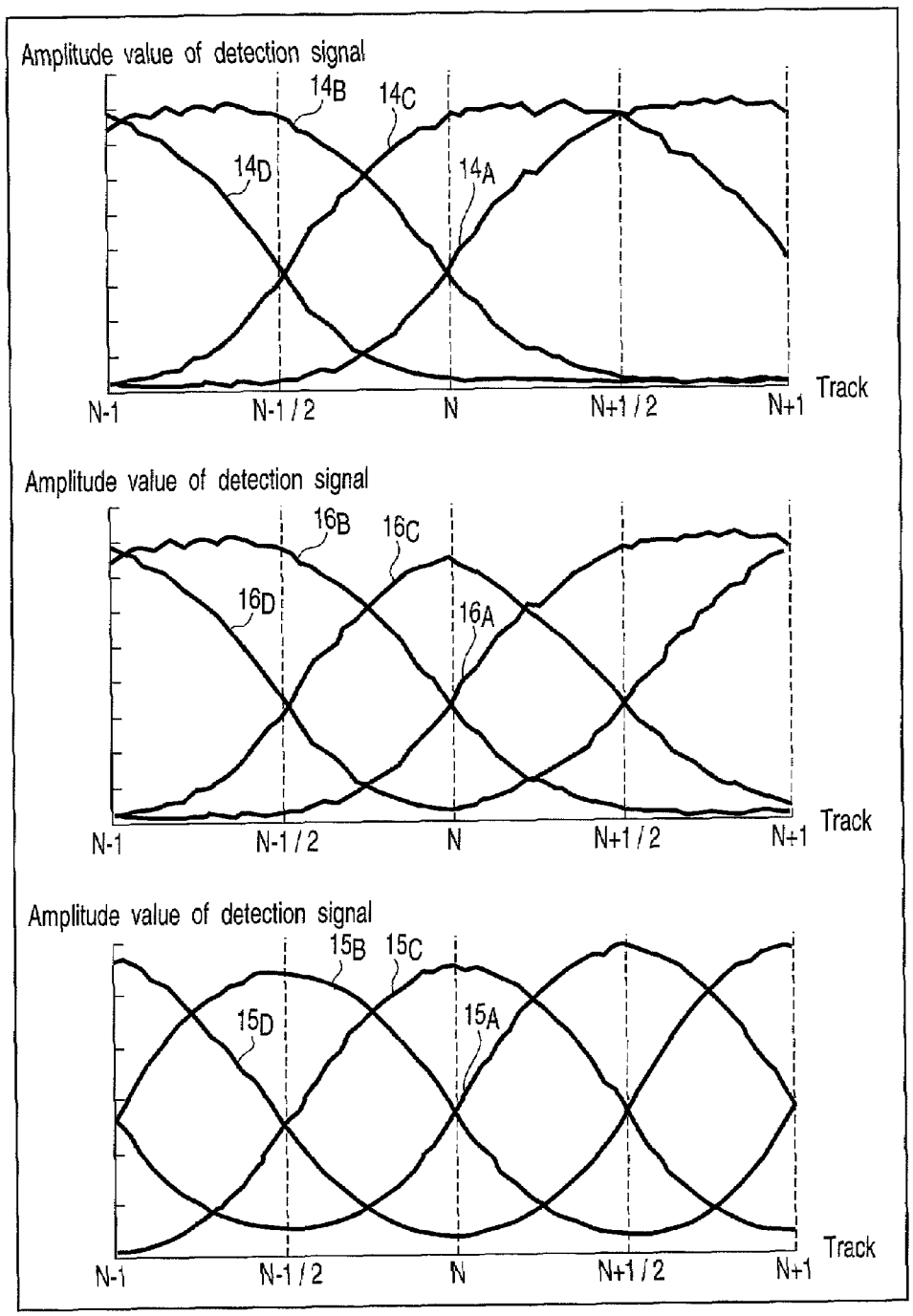
FIG. 11 shows a change in an amplitude value of each of selected four frame signals, a change in an amplitude value of each of four signals generated by a combination of selected first to sixth frame signals, and a change in an amplitude value of each of servo burst signals A, B, C, and D.

FIG. 11 shows the change in an amplitude value of each of the selected four frame signals (graph shown in an upper portion of FIG. 11), the change in an amplitude value of each of the four signals generated by the combination of selected first to sixth frame signals (graph shown in a central portion of FIG. 11), and the change in an amplitude value of each of the servo burst signals A, B, C, and D (graph shown in a lower portion of FIG. 11).

In FIG. 11, the numeral 14 designates amplitude values of the four frame signals (frame signals $13_5$, $13_{11}$, $13_7$, and $13_{13}$) which are selected as the first to fourth frames corresponding to the servo burst signals A, B, C, and D. Each of the suffixes A to D added to the numeral 14 designates a kind of the corresponding burst signal. That is, the numeral $14_A$ designates the change in amplitude of the frame signal $13_5$ which is selected as the first frame corresponding to the servo burst signal A. Similarly, the numeral $14_B$ designates the change in amplitude of the frame signal $13_{11}$ which is selected as the second frame corresponding to the servo burst signal B, the numeral $14_C$ designates the change in amplitude of the frame signal $13_7$ which is selected as the third frame corresponding to the servo burst signal C, and the numeral $14_D$ designates the change in amplitude of the frame signal $13_{13}$ which is selected as the fourth frame corresponding to the servo burst signal D.

The numeral 15 designates an amplitude value of each of the servo burst signals A, B, C, and D. Each of the suffixes A to D added to the numeral 15 designates a kind of the corresponding burst signal. That is, the numeral $15_A$ designates the change in amplitude of the servo burst signal A. Similarly, the numeral $15_B$ designates the change in amplitude of the servo burst signal B, the numeral $15_C$ designates the change in amplitude of the servo burst signal C, and the numeral $15_D$ designates the change in amplitude of the servo burst signal D.

The numeral 16 designates an amplitude value of each of the four signals corresponding to the servo burst signals A, B, C, and D. The servo burst signals A, B, C, and D are produced using the first to sixth frames (frame signals $13_5$, $13_{11}$, $13_7$, $13_{13}$, $13_9$, and $13_3$). Each of the suffixes A to D added to the numeral 16 designates a kind of the corresponding burst signal. That is, the numeral $16_A$ designates the change in amplitude of the frame signal $13_5$ which is selected as the first frame corresponding to the servo burst signal A. Similarly, the numeral $16_B$ designates the change in amplitude of the frame signal $13_{11}$ which is selected as the second frame corresponding to the servo burst signal B, the numeral $16_C$ designates the change in amplitude of the signal which is produced by the combination of the frame signal $13_7$ and frame signal $13_9$ selected as the two frames (third frame and fifth frame) corresponding to the servo burst signal C, and the numeral $16_D$ designates the change in amplitude of the signal which is produced by the combination of the frame signal $13_{13}$ and frame signal $13_3$ selected as the two frames (fourth frame and sixth frame) corresponding to the servo burst signal D.

The relationship between the graph shown in the upper portion of FIG. 11 and the graph shown in the lower portion of FIG. 11 is compared with the relationship between the graph shown in the central portion of FIG. 11 and the graph shown in the lower portion of FIG. 11. As a result of the comparison, it is to be understood that the graph shown in the central portion of FIG. 11 has characteristics more similar to those of the graph shown in the lower portion of FIG. 11 rather than the graph shown in the upper portion of FIG. 11.

Thus, in the embodiment, each of the servo burst signals C and D is produced by the combination of the two frames. This enables the signal group having amplitude characteristics more similar to those of the servo burst signals A, B, C, and D to be produced from the detection signal 11.

Figure 12:
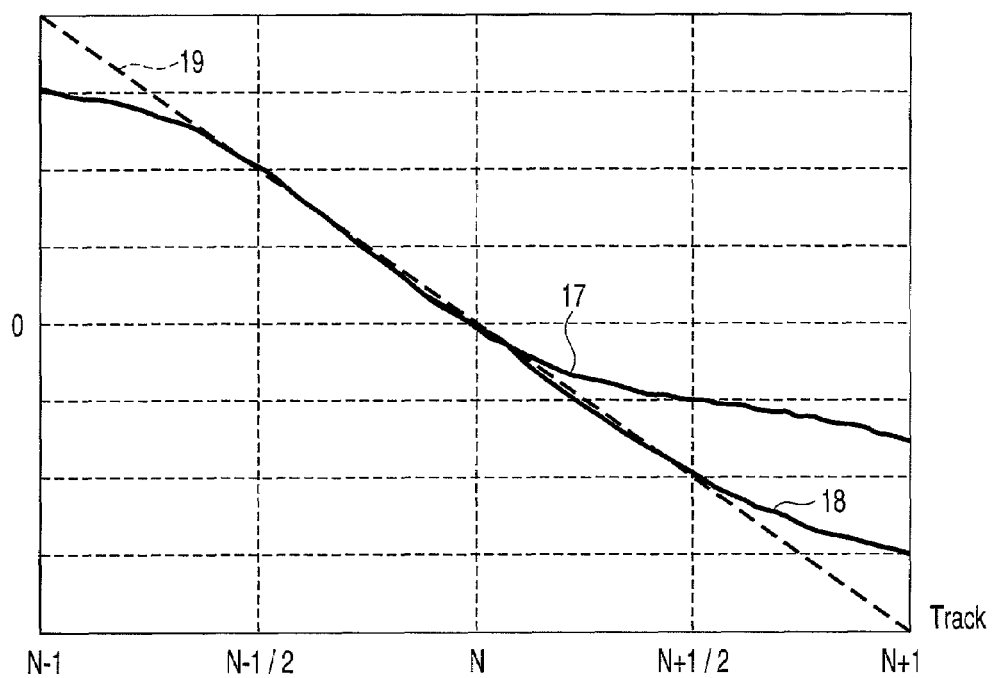
FIG. 12 shows position error computation result performed by the disk drive device of the embodiment.

The numeral 17 in FIG. 12 shows the result of the position error computed by using the frame signals $14_A$ to $14_D$ shown in the upper portion of FIG. 11 as the servo burst signals A to D. The numeral 18 in FIG. 12 shows the result of the position error computed by using the frame signals $16_A$ to $16_D$ shown in the central portion of FIG. 11 as the servo burst signals A to D. The dotted line 19 in FIG. 12 shows the ideal computation result of the position error. The position error is computed as follows.

That is, using the plural frames constituting the detection signal of the spiral servo pattern, CPU 170 produces the frame signals $16_A$ to $16_D$ shown in the central portion of FIG. 11 as the servo burst signals A to D. At this point, each of the servo burst signals C and D is produced by the combination of at least two predetermined frames in the plural frames. Each of the servo burst signals A and B is produced using one predetermined frame in the plural frames.

CPU 170 computes the position error of the head 5 (read head) using the amplitude value of each of the servo burst signals A to D produced from the detection signal of the spiral servo pattern. The amplitude values of the servo burst signal A to D are the amplitude values of the frame signals 16A to 16D shown in the central portion of FIG. 11, respectively. CPU 170 performs the head positioning control (tracking) of the head 5 (read head) based on the computation result of the position error.

For example, CPU 170 performs the position error computation shown by the following equations (4) to (6):

$$\text{pos1} = (A-B)/(A+B) \quad (4)$$

$$\text{pos2} = (C-D)/(C+D) \quad (5)$$

$$\text{POS} = (\text{pos1} + \text{pos2})/2 \quad (6)$$

where POS is an position error, and letters A to D are amplitude values of the servo burst signals A to D produced from the detection signal of the spiral servo pattern, respectively.

As can be seen from FIG. 12, in the region between the track N and the track N+½, the position error computation result shown by the numeral 17 is shifted from the ideal characteristics shown by the dotted line 19, and the accuracy of position error detection is not sufficiently obtained. On the other hand, in the numeral 18, a small amount of shift from the ideal characteristics shown by the dotted line 19 is generated, and the accuracy of position error detection is sufficiently obtained. Thus, in the position error computation result shown by the numeral 18, the linearity is sufficiently improved compared with the position error computation result shown by the numeral 17, and the position error computation result shown by the numeral 18 is brought close to the ideal characteristics shown by the dotted line 19.

How the frame group used to compute the position error is specified will be described below with reference to FIGS. 13 and 14. In the embodiment, the detection signal 11 obtained by reading the spiral servo pattern is divided at even time intervals into the plural frames, and a frame $F_{MAX}$ whose amplitude value becomes the maximum in the plural frames is set at a reference. The frames $F_A$, $F_B$, $F_C$, and $F_D$ which should correspond to the servo burst signals A, B, C, and D are determined based on a positional relationship with the frame $F_{MAX}$. When an inclination and a width of the multi spiral servo pattern, and a frame width are kept constant, the positional relationship between the frame $F_{MAX}$ and each of the frame groups $F_A$, $F_B$, $F_C$, and $F_D$ is maintained irrespective of the radial position of the head 5 on the disk media 1.

FIG. 13 shows a relationship between the corresponding frames $F_{MAX}$ and the frames $F_A$, $F_B$, $F_C$, and $F_D$ when the frame signals $14_A$ to $14_D$ shown in the upper portion of FIG. 11 are used as the servo burst signals A to D.

The frames ($F_{MAX}$) and the frames $F_A$, $F_B$, $F_C$, and $F_D$ which should correspond to the servo burst signals A, B, C, and D are associated as follows:

frame in which amplitude value becomes maximum in track center:$F_{MAX}$
frame corresponding to servo burst signal A:$F_A = F_{MAX}+3$
frame corresponding to servo burst signal B:$F_B = F_{MAX}-3$
frame corresponding to servo burst signal C:$F_C = F_{MAX}-1$
frame corresponding to servo burst signal D:$F_D = F_{MAX}+5$ For example, when the frame 8 is the frame number in which the amplitude value becomes the maximum in the plural frames, the frame number of the first frame $F_A$ which should correspond to the servo burst signal A becomes the frame 11 (=8+3). The frame number of the second frame $F_B$ which should correspond to the servo burst signal B becomes the frame 5 (=8−3). The frame number of the third frame $F_C$ which should correspond to the servo burst signal C becomes the frame 7 (=8−1). The frame number of the fourth frame $F_D$ which should correspond to the servo burst signal D becomes the frame 13 (=8+5).

Thus, through the above-described association, even if the radial position of the head 5 is changed, the frame which should be used as each of the servo burst signals A to D can be specified from the positional relationship with the frame $F_{MAX}$ only by detecting the frame $F_{MAX}$ having the largest amplitude in the plural frames.

Figure 14:
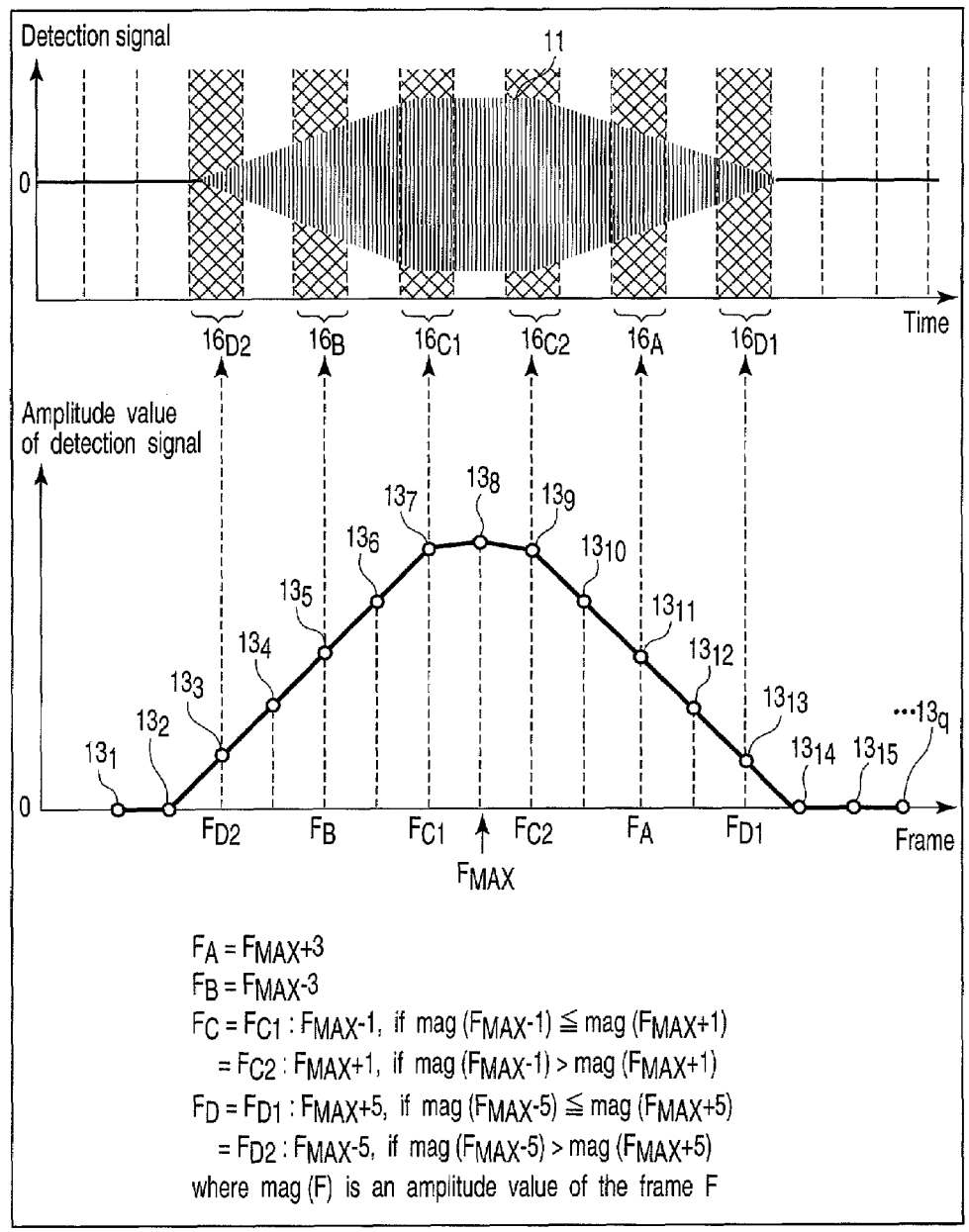
FIG. 14 is an exemplary view for explaining an example of a relationship between each frames and servo burst signals A, B, C, and D in the disk drive device of the embodiment.

FIG. 14 shows a relationship between the frames $F_{MAX}$ and the frames $F_A$, $F_B$, $F_C$, and $F_D$ when the frame signals $16_A$ to $16_D$ shown in the central portion of FIG. 11 are used as the servo burst signals A to D.

The frames ($F_{MAX}$) and the frames $F_A$, $F_B$, $F_C$, and $F_D$ which should correspond to the servo burst signals A, B, C, and D are associated as follows:

frame in which amplitude value becomes maximum in track center:$F_{MAX}$
frame corresponding to servo burst signal A:$F_A = F_{MAX}+3$
frame corresponding to servo burst signal B:$F_B = F_{MAX}-3$
frame corresponding to servo burst signal C:$F_C$
$= F_{C1}$:$F_{MAX}-1$, if mag ($F_{MAX}-1$) ≦ mag ($F_{MAX}+1$)
$= F_{C2}$:$F_{MAX}+1$, if mag ($F_{MAX}-1$) > mag ($F_{MAX}+1$)
frame corresponding to servo burst signal D: $F_D$
$= F_{D1}$:$F_{MAX}+5$, if mag ($F_{MAX}-5$) ≦ mag ($F_{MAX}+5$)
$= F_{D2}$:$F_{MAX}-5$, if mag ($F_{MAX}-5$) > mag ($F_{MAX}+5$)
where mag (F) is an amplitude value of the frame F.

For example, when the frame 8 is the frame number in which the amplitude value becomes the maximum in the plural frames, the frame number of the first frame $F_A$ which should correspond to the servo burst signal A becomes the frame 11 (=8+3). The frame number of the second frame $F_B$ which should correspond to the servo burst signal B becomes the frame 5 (=8−3). The frame number of the third frame $F_{C1}$ which should correspond to the servo burst signal C becomes the frame 7 (=8−1), and the frame number of the fifth frame $F_{C2}$ which should correspond to the servo burst signal C becomes the frame 9 (=8+1). One of the frame $F_{C1}$ and frame $F_{C2}$ having the smaller amplitude value is used as the servo burst signal C. The frame number of the fourth frame $F_{D1}$ which should correspond to the servo burst signal D becomes the frame 13 (=8+5), and the frame number of the sixth frame $F_{D2}$ which should correspond to the servo burst signal D becomes the frame 3 (=8−5). One of the frame $F_{D1}$ and frame $F_{D2}$ having the larger amplitude value is used as the servo burst signal D.

Thus, through the above-described association, even if the radial position of the head 5 is changed, the frame which should be used as each of the servo burst signals A to D can be specified from the positional relationship with the frame $F_{MAX}$ only by detecting the frame $F_{MAX}$ in which amplitude value in track center becomes maximum in plural frames.

In the embodiment, each of the servo burst signals C and D is produced by the combination of the two frames. Alternatively, depending on a time length of each slot, each of the servo burst signals C and D may be produced by the combination of at least two frames (for example, three frames). Alternatively, only one of the servo burst signals C and D may be produced by the combination of the two frames while the other is produced using one frame.

Figure 15:
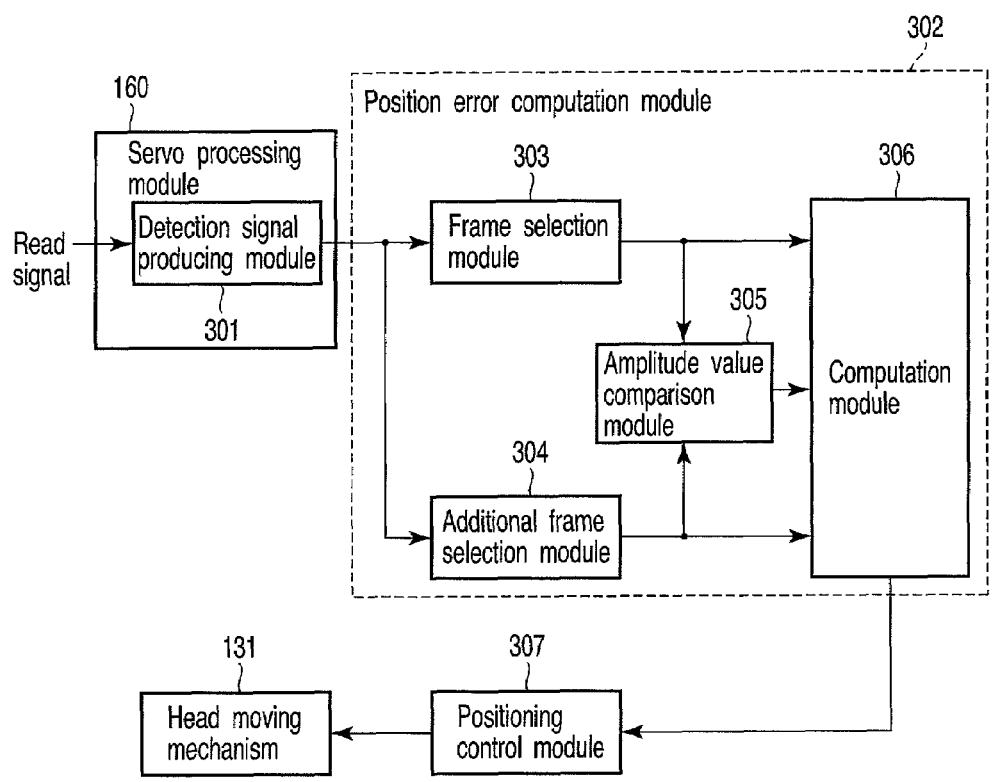
FIG. 15 is an exemplary block diagram showing a configuration example of a position error computation module provided in the disk drive device of the embodiment.

FIG. 15 shows a configuration example of an electronic circuit used to position the head 5.

The head positioning control process of the head 5 is performed by a detection signal producing module 301, a position error computation module 302, and a head positioning control module 307. The detection signal producing module 301 is provided in, for example, the servo processing module 160 of FIG. 1. The detection signal producing module 301 produces the hexagonal detection signal from each spiral servo pattern which is read by the head 5 while the head 5 scans the circumferential region on the disk media 1. The position error computation module 302 computes the position error of the head 5 according to the position error computation algorithm for the radial servo pattern. The position error computation module 302 produces the servo burst signals A, B, C, and D using the plural frames obtained by dividing the detection signal at even time intervals. At this point, using at least two predetermined frames in the plural frames, the position error computation module 302 produces at least one burst signal (for example, servo burst signal C or D) in the servo burst signals A, B, C, and D. The position error computation module 302 produces each of other burst signals in the servo burst signals A, B, C, and D using predetermined one frame in the plural frames. In the process for producing at least one burst signal (for example, servo burst signal C or D), the position error computation module 302 compares the amplitude values of the frames in at least the two predetermined frames. The position error computation module 302 selects the frame having the smallest amplitude value or the frame having the largest amplitude value from the at least the two predetermined frames based on the comparison result. The amplitude value of the selected frame is used as the amplitude value of at least the one burst signal (for example, servo burst signal C or D).

Then, the position error computation module 302 computes the position error of the head 5 according to the position error computation algorithm for the radial servo pattern (equations (4) to (6)). The amplitude value of at least the one produced burst signal and the amplitude value of each of other produced burst signal are used in the computation.

The head positioning control module 307 controls the head moving mechanism 131 of FIG. 1 to position the head 5 at the target position on the disk media 1. The head moving mechanism 131 is controlled based on the computed position error.

The position error computation module 302 includes a frame selection module 303, an additional frame selection module 304, an amplitude value comparison module 305, and an arithmetic module 306. The frame selection module 303 selects the first frame $F_A$, second frame $F_B$, third frame $F_{C1}$, and fourth frame $F_{D1}$ which should correspond to the servo burst signals A, B, C, and D from the plural frames. The additional frame selection module 304 selects the fifth frame $F_{C2}$ as an additional frame which should correspond to the servo burst signal C. The additional frame selection module 304 also selects the sixth frame $F_{D2}$ as an additional frame which should correspond to the servo burst signal D. The amplitude value comparison module 305 compares the amplitude values of the third frame $F_{C1}$ and fifth frame $F_{C2}$, and the amplitude value comparison module 305 notifies the arithmetic module 306 of the comparison result. The amplitude value comparison module 305 also compares the amplitude values of the fourth frame $F_{D1}$ and sixth frame $F_{D2}$, and the amplitude value comparison module 305 notifies the arithmetic module 306 of the comparison result.

The arithmetic module 306 computes the position error of the head 5 (read head) using the amplitude values of the servo burst signals A and B, the amplitude value of the servo burst signal C, and the amplitude value of the servo burst signal D. The amplitude values of the frame $F_A$ and $F_B$ are used as the amplitude values of the servo burst signals A and B. The amplitude value of the signal produced by the combination of the frames $F_{C1}$ and $F_{C2}$ is used as the amplitude value of the servo burst signal C. The amplitude value of the signal produced by the combination of the frames $F_{D1}$ and $F_{D2}$ is used as the amplitude value of the servo burst signal D. In producing the servo burst signal C, based on the comparison result of the amplitude values of the third frame $F_{C1}$ and fifth frame $F_{C2}$, the arithmetic module 306 selects the frame having the smaller amplitude value in the frames $F_{C1}$ and $F_{C2}$. The arithmetic module 306 selects the amplitude value of the selected frames as the amplitude value of the servo burst signal C. In producing the servo burst signal D, based on the comparison result of the amplitude values of the fourth frame $F_{D1}$ and sixth frame $F_{D2}$, the arithmetic module 306 selects the frame having the larger amplitude value in the frames $F_{D1}$ and $F_{D2}$. The arithmetic module 306 selects the amplitude value of the selected frames as the amplitude value of the servo burst signal D.

The position error computation module 302 and the head positioning control module 307 are realized by dedicated circuits, respectively. However, functions of the position error computation module 302 and head positioning control module 307 may be realized by pieces of software executed by CPU 170, respectively.

Figure 16:
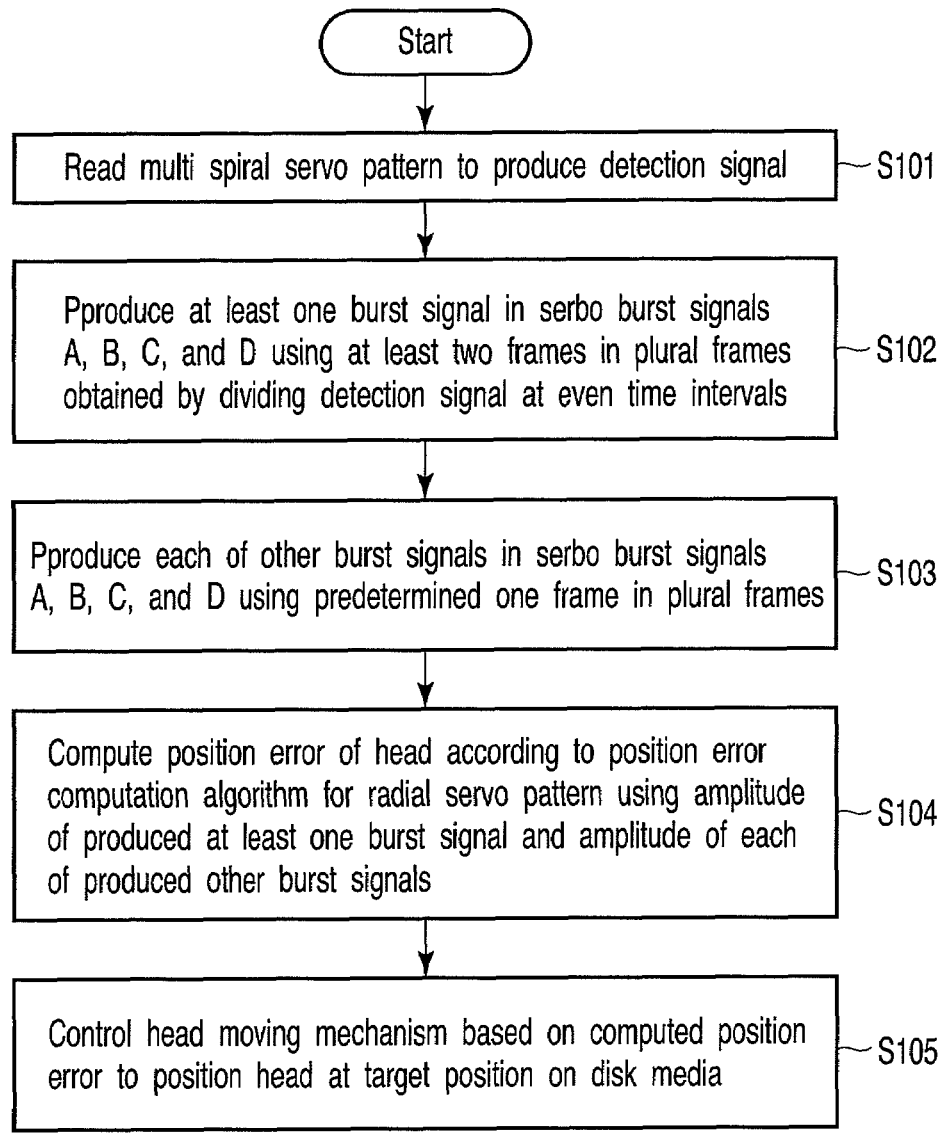
FIG. 16 is an exemplary flowchart showing a procedure for a head positioning control process performed by the disk drive device of the embodiment.

A procedure for the head positioning control process of the embodiment will be described below with reference to a flowchart of FIG. 16.

In the following description, it is assumed that CPU 170 computes the position error. The detection signal producing module 301 produces the hexagonal detection signal from each spiral servo pattern which is read while the head 5 scans the circumferential region on the disk media 1 (Step S101).

CPU 170 produces at least one burst signal in the servo burst signals A, B, C, and D using the combination of at least two predetermined frames in the plural frames obtained by dividing the detection signal at even time intervals (Step S102). In Step S102, for example, two frames (frames $F_{C1}$ and $F_{C2}$) are selected for the servo burst signal C, and the servo burst signal C is produced by the combination of the two frames. Two frames (frames $F_{D1}$ and $F_{D2}$) are also selected for the servo burst signal D, and the servo burst signal D is produced by the combination of the two frames.

CPU 170 produces each of other burst signals in the servo burst signals A, B, C, and D using predetermined one frames in the plural frames (Step S103). In Step S103, CPU 170 selects the frame $F_A$ corresponding to the servo burst signal A and uses the frame $F_A$ as the servo burst signal A. CPU 170 also selects the frame $F_B$ corresponding to the servo burst signal B and uses the frame $F_B$ as the servo burst signal B.

CPU 170 computes the position error used in the tracking using the amplitude value of each of the servo burst signals A, B, C, and D produced from the detection signal (Step S104). CPU 170 controls the head moving mechanism 131 based on the computed position error, and CPU 170 positions the head 5 at the target position such that the position of the head 5 is maintained in the center of the target track (Step S105).

Thus, in the embodiment, the hexagonal detection signal is produced from the multi spiral servo pattern, and the servo burst signals A to D are produced using the plural frames obtained by dividing the detection signal at even time intervals. In this case, at least one signal in the servo burst signals A, B, C, and D is produced using the combination of at least two frames. Accordingly, the head 5 can be positioned with sufficient accuracy using the detection signal obtained by reading the plural spiral servo patterns.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive device comprising:
   a disk media in which a plurality of spiral servo patterns are written;
   a head configured to read data from and write date in the disk media;
   a head moving mechanism configured to move the head in a radial direction on the disk media;
   a detection signal producing module configured to produce a detection signal comprising particular signal pattern by reading each of the spiral servo patterns, the spiral servo patterns being read by the head while the head scans a circumferential direction region on the disk media;
   a position error computation module configured to produce at least one of a first, second, third and fourth servo burst signal using a plurality of predetermined frames obtained by dividing the detection signal at even time intervals, the first, second, third and fourth servo burst signals being included in each of a plurality of radial servo patterns used to define a concentric track on the disk media, and to produce each of the other burst signals of the first, second, third and fourth servo burst signals using predetermined one frame of the plurality of frames, and to compute a position error of the head based on amplitude values of the produced burst signals; and
   a positioning module configured to position the head at a target position on the disk media based on the computed position error.

2. The disk drive device of claim 1, wherein the position error computation module is configured to compare the amplitude values of in the at least two predetermined frames, to select the frame having either the minimum amplitude or the maximum amplitude from the at least two predetermined frames based on the comparison result, and to use the amplitude of the selected frame as the amplitude of the at least one burst signal.

3. The disk drive device of claim 1, wherein the at least one burst signal in the four servo burst signals is one of either the third servo burst signal or the fourth servo burst signal.

4. The disk drive device of claim 1, wherein the at least one burst signal in the four servo burst signals is both the third servo burst signal and the fourth servo burst signal.

5. A disk drive device comprising:
   a disk media in which a plurality of spiral servo patterns are written;
   a head;
   a head moving mechanism configured to move the head in a radial direction on the disk media;
   a detection signal producing module configured to produce a detection signal by reading each of the spiral servo patterns, the spiral servo patterns being read by the head while the head scans a circumferential direction region on the disk media;
   a position error computation module configured to compute a position error of the head according to a position error computation algorithm, an amplitude value of each of a first, second, third and fourth servo burst signals being used in the position error computation algorithm, the position error computation module selecting a first frame, a second frame, a third frame, and a fourth frame from a plurality of frames obtained by dividing the detection signal at even time intervals, the first frame, the second frame, the third frame, and the fourth frame corresponding respectively to the first, second, third, and fourth servo burst signals, the position error computation module also selecting a fifth frame and a sixth frame corresponding to the third and fourth servo burst signals respectively, the position error computation module computing the position error of the head while the selected first frame and the selected second frame are used as the first and second servo burst signals, while a signal obtained by combining the selected third frame and the selected fifth frame is used as the third servo burst signal, and while a signal obtained by combining the selected fourth frame and the selected sixth frame is used as the fourth servo burst signal; and
   a head positioning module configured to control the head moving mechanism based on the computed position error to position the head at a target position on the disk media.

6. A method of positioning a head at a target position on a disk media in a disk drive device, a plurality of spiral servo patterns being written in the disk media and a head moving mechanism configured to move the head in a radial direction on the disk media the method comprising:
   producing a detection signal comprising a particular signal pattern from each of the spiral servo patterns, the spiral servo patterns being read by a head while the head scans a circumferential direction region on the disk media;
   producing at least one of a first, second, third and fourth servo burst signal using a plurality of predetermined frames obtained by dividing the detection signal at even time intervals, the first, second, third and fourth servo burst signals being included in each of a plurality of radial servo patterns used to define a concentric track on the disk media, and producing each of the other burst signals of the first, second, third and fourth servo burst signals using predetermined one frame of the plurality of frames;
   computing a position error of the head based on amplitude values of the produced burst signals; and
   positioning the head at the target position on the disk media based on the computed position error.

7. The method of claim 6, wherein the computing the position error includes comparing the amplitude values of in the at least predetermined two frames, selecting the frame having the minimum amplitude or the frame having the maximum amplitude from the at least two predetermined frames based on the comparison result, and using the amplitude of the selected frame as the amplitude of the at least one burst signal.

8. The method of claim 6, wherein said at least one burst signal in the four servo burst signals is one of either the third servo burst signal or the fourth servo burst signal.

9. The method of claim 6, wherein the at least one burst signal in the four servo burst signals is both the third servo burst signal and the fourth servo burst signal.

* * * * *